(12) United States Patent
Agarwal et al.

(10) Patent No.: US 7,447,701 B2
(45) Date of Patent: *Nov. 4, 2008

(54) AUTOMATIC CONFIGURATION OF ATTRIBUTE SETS

(75) Inventors: Sachin Agarwal, Santa Clara, CA (US); Michele C. Lee, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/354,913

(22) Filed: Jan. 30, 2003

(65) Prior Publication Data

US 2004/0010514 A1 Jan. 15, 2004

Related U.S. Application Data

(60) Provisional application No. 60/395,152, filed on Jul. 11, 2002.

(51) Int. Cl.
*G06F 17/00* (2006.01)
(52) U.S. Cl. .......................... 707/103 Z; 707/4; 707/10; 707/101; 707/102; 707/104.1
(58) Field of Classification Search .............. 707/104.1, 707/100, 102, 101, 1, 3, 103, 103 Y, 4, 10, 707/103 R, 200, 103 Z
See application file for complete search history.

(56) References Cited

U.S. PATENT DOCUMENTS

| | | | |
|---|---|---|---|
| 5,010,478 A * | 4/1991 | Deran | ......................... 707/100 |
| 5,077,666 A | 12/1991 | Brimm et al. | |
| 5,455,953 A | 10/1995 | Russell | |
| 5,530,861 A | 6/1996 | Diamant et al. | |
| 5,581,691 A | 12/1996 | Hsu et al. | |
| 5,664,154 A | 9/1997 | Purcell et al. | |
| 5,678,041 A | 10/1997 | Baker et al. | |
| 5,692,125 A | 11/1997 | Schloss et al. | |

(Continued)

OTHER PUBLICATIONS

Jung-Jang Jeng, "An Approach to Designing Reusable Service Frameworks via Virtual Service Machine", ACM, May 18-20, 2001, pp. 58-66.*

(Continued)

*Primary Examiner*—Thuy N Pardo
(74) *Attorney, Agent, or Firm*—Townsend and Townsend and Crew LLP

(57) ABSTRACT

Technology is disclosed for automatically configuring attribute sets, such as object classes and classes of database tables. A system employing an object class, such as an Identity or Access System, configures the object class for use by the system. One version of the system employs a template that includes entries for attributes in the object class. An example entry identifies an attribute and a corresponding meta-attribute. Alternatively, the template may support multiple object classes and include entries with different types of information. During configuration, the system selects an attribute in the object class and identifies a corresponding template entry. The system configures the attribute, based on the information in the template entry. One type of configuration includes the system assigning a meta-attribute from the template entry to the attribute. The system repeats this procedure for each attribute in the object class or at least a subset of the attributes that need configuration.

100 Claims, 7 Drawing Sheets

U.S. PATENT DOCUMENTS

| | | | | |
|---|---|---|---|---|
| 5,708,780 | A | 1/1998 | Levergood et al. | |
| 5,721,900 | A | 2/1998 | Banning et al. | |
| 5,724,595 | A | 3/1998 | Gentner | |
| 5,732,408 | A | 3/1998 | Takahashi | |
| 5,764,890 | A | 6/1998 | Glasser et al. | |
| 5,815,703 | A | 9/1998 | Copeland et al. | |
| 5,848,273 | A * | 12/1998 | Fontana et al. | 717/108 |
| 5,944,824 | A | 8/1999 | He | |
| 5,991,810 | A | 11/1999 | Shapiro et al. | |
| 5,999,911 | A | 12/1999 | Berg et al. | |
| 6,014,666 | A | 1/2000 | Helland et al. | |
| 6,073,109 | A | 6/2000 | Flores et al. | |
| 6,078,747 | A | 6/2000 | Jewitt | |
| 6,098,056 | A | 8/2000 | Rusnak et al. | |
| 6,105,035 | A * | 8/2000 | Monge et al. | 707/103 R |
| 6,131,120 | A | 10/2000 | Reid | |
| 6,134,634 | A | 10/2000 | Marshall, Jr. et al. | |
| 6,138,104 | A | 10/2000 | Marchak et al. | |
| 6,141,778 | A | 10/2000 | Kane et al. | |
| 6,145,003 | A | 11/2000 | Sanu et al. | |
| 6,151,531 | A | 11/2000 | Frankel et al. | |
| 6,158,010 | A | 12/2000 | Moriconi et al. | |
| 6,182,142 | B1 | 1/2001 | Win et al. | |
| 6,195,710 | B1 | 2/2001 | Borgendale et al. | |
| 6,208,986 | B1 * | 3/2001 | Schneck et al. | 707/3 |
| 6,212,558 | B1 | 4/2001 | Antur et al. | |
| 6,253,239 | B1 * | 6/2001 | Shklar et al. | 709/217 |
| 6,253,257 | B1 | 6/2001 | Dundon | |
| 6,256,739 | B1 | 7/2001 | Skopp et al. | |
| 6,260,077 | B1 | 7/2001 | Rangarajan et al. | |
| 6,266,420 | B1 | 7/2001 | Langford et al. | |
| 6,278,993 | B1 | 8/2001 | Kumar et al. | |
| 6,279,043 | B1 | 8/2001 | Hayward et al. | |
| 6,314,470 | B1 | 11/2001 | Ward et al. | |
| 6,323,881 | B1 | 11/2001 | Broulik | |
| 6,338,097 | B1 | 1/2002 | Krenzke et al. | |
| 6,343,287 | B1 * | 1/2002 | Kumar et al. | 707/4 |
| 6,347,312 | B1 | 2/2002 | Byrne et al. | |
| 6,349,306 | B1 * | 2/2002 | Malik et al. | 707/103 R |
| 6,353,929 | B1 | 3/2002 | Houston | |
| 6,366,913 | B1 | 4/2002 | Fitler, Jr. et al. | |
| 6,401,101 | B1 * | 6/2002 | Britton et al. | 707/103 X |
| 6,401,138 | B1 | 6/2002 | Judge et al. | |
| 6,415,368 | B1 | 7/2002 | Glance et al. | |
| 6,434,531 | B1 | 8/2002 | Lancelot et al. | |
| 6,442,567 | B1 | 8/2002 | Retallick et al. | |
| 6,490,655 | B1 | 12/2002 | Kershaw | |
| 6,499,023 | B1 | 12/2002 | Dong et al. | |
| 6,523,022 | B1 | 2/2003 | Hobbs | |
| 6,529,941 | B2 | 3/2003 | Haley et al. | |
| 6,539,379 | B1 | 3/2003 | Vora et al. | |
| 6,549,941 | B1 | 4/2003 | Jaquith et al. | |
| 6,611,840 | B1 * | 8/2003 | Baer et al. | 707/102 |
| 6,671,695 | B2 | 12/2003 | McFadden | |
| 6,671,745 | B1 | 12/2003 | Mathur et al. | |
| 6,701,368 | B1 | 3/2004 | Chennapragada et al. | |
| 6,704,807 | B1 | 3/2004 | Mathur et al. | |
| 6,704,873 | B1 | 3/2004 | Underwood | |
| 6,708,170 | B1 | 3/2004 | Byrne et al. | |
| 6,721,804 | B1 | 4/2004 | Rubin et al. | |
| 6,732,178 | B1 | 5/2004 | Van Horne et al. | |
| 6,732,179 | B1 | 5/2004 | Brown et al. | |
| 6,741,853 | B1 | 5/2004 | Jiang et al. | |
| 6,760,750 | B1 | 7/2004 | Boneh et al. | |
| 6,768,988 | B2 | 7/2004 | Boreham et al. | |
| 6,785,686 | B2 * | 8/2004 | Boreham et al. | 707/102 |
| 6,785,713 | B1 | 8/2004 | Freeman et al. | |
| 6,785,726 | B1 | 8/2004 | Freeman et al. | |
| 6,816,871 | B2 * | 11/2004 | Lee | 707/104.1 |
| 6,839,701 | B1 * | 1/2005 | Baer et al. | 707/3 |
| 6,880,086 | B2 | 4/2005 | Kidder et al. | |
| 6,948,135 | B1 | 9/2005 | Ruthfield et al. | |
| 7,013,435 | B2 | 3/2006 | Gallo et al. | |
| 7,013,469 | B2 | 3/2006 | Smith et al. | |
| 7,035,926 | B1 | 4/2006 | Cohen et al. | |
| 7,039,871 | B2 | 5/2006 | Cronk | |
| 7,069,330 | B1 | 6/2006 | McArdle et al. | |
| 7,076,784 | B1 | 7/2006 | Russell et al. | |
| 7,114,037 | B2 | 9/2006 | Agarwal et al. | |
| 7,120,914 | B1 | 10/2006 | Manthos et al. | |
| 2002/0032684 | A1 * | 3/2002 | Kobayashi et al. | 707/100 |
| 2002/0038306 | A1 * | 3/2002 | Griffin et al. | 707/101 |
| 2002/0049749 | A1 | 4/2002 | Helgeson et al. | |
| 2002/0067370 | A1 | 6/2002 | Forney et al. | |
| 2002/0073180 | A1 | 6/2002 | Dewhurst et al. | |
| 2002/0083178 | A1 | 6/2002 | Brothers | |
| 2002/0138763 | A1 | 9/2002 | Delany et al. | |
| 2003/0028752 | A1 * | 2/2003 | Fu et al. | 712/200 |
| 2003/0037052 | A1 * | 2/2003 | Kitain et al. | 707/10 |
| 2003/0055806 | A1 * | 3/2003 | Wong et al. | 707/1 |
| 2003/0083908 | A1 | 5/2003 | Steinmann | |
| 2003/0088708 | A1 * | 5/2003 | Lewallen | 709/315 |
| 2003/0097380 | A1 * | 5/2003 | Mulhern et al. | 707/200 |
| 2003/0105733 | A1 * | 6/2003 | Boreham et al. | 707/1 |
| 2003/0105742 | A1 * | 6/2003 | Boreham et al. | 707/2 |
| 2003/0115196 | A1 * | 6/2003 | Boreham et al. | 707/4 |
| 2003/0115548 | A1 * | 6/2003 | Melgar | 715/513 |
| 2003/0120593 | A1 | 6/2003 | Bansal et al. | |
| 2003/0120601 | A1 | 6/2003 | Ouye et al. | |
| 2003/0144982 | A1 | 7/2003 | Reulein et al. | |
| 2003/0145074 | A1 * | 7/2003 | Penick | 709/223 |
| 2003/0204481 | A1 * | 10/2003 | Lau | 707/1 |
| 2003/0217127 | A1 | 11/2003 | Sinn | |
| 2003/0217333 | A1 | 11/2003 | Smith et al. | |
| 2004/0003351 | A1 | 1/2004 | Sommerer et al. | |
| 2004/0024762 | A1 | 2/2004 | Agarwal et al. | |
| 2005/0240490 | A1 | 10/2005 | Mackey | |

OTHER PUBLICATIONS

Nenad Medvidovic et al., "Modeling Software Architectures in the Unified Modeling Language", ACM, Jan. 2002, pp. 2-57.*

Leon, McAfee's NetTools Promises to Ease Network Desktop Diagnosis, InfoWorld, San Mateo, Jul. 24, 1995, vol. 17, Iss. 30, p. 53.

Cooney, IBM rolls out host- and server-based mgmt. apps, Network World, Framingham, Feb. 6, 1995, vol. 12, Iss. 6, pp. 6-7.

Walsh, Remedy releases three applications for help-desk suite, InfoWorld, San Mateo, Apr. 21, 1997, vol. 19, Iss. 16, p. 34.

Schmersal, Testing to maintain service standards, Communications News, Nokomis, Mar. 1998, vol. 35, Iss. 3, pp. 22-23.

Musthaler, The trouble with help desk selection, Network World, Framingham, Feb. 20, 1995, vol. 12, Iss. 8, pp. 35-39.

Clear Trust, Unified Access Management, Securant Technologies, Inc., pp. 1-23, 1997.

SiteMinder Agent Operations, Verson 4.0, Netegrity Inc., 1997.

SiteMinder Deployment Guide, Version 4.0, Netegrity Inc., 1997.

SiteMinder Policy Server Operations Guide, Version 4.0, Netegrity Inc., 1997.

SiteMinder Developer's API Guide, Version 4.0, Netegrity Inc., 1997.

SiteMinder Installation Guide, Version 4.0, Netegrity Inc., 1997.

U.S. Appl. No. 10/314,888, Office Action dated Jan. 26, 2006, 31 pages.

U.S. Appl. No. 10/327,607, Office Action dated Feb. 13, 2006, 5 pages.

U.S. Appl. No. 10/345,873, Office Action dated Sep. 9, 2005, 13 pages.

U.S. Appl. No. 10/345,873, Office Action dated Mar. 10, 2006, 7 pages.

U.S. Appl. No. 10/354,914, Office Action dated Aug. 1, 2005, 15 pages.

U.S. Appl. No. 10/354,914, Final Office Action dated Feb. 10, 2006, 16 pages.

Kim, K.H., "APIs for Real-Time Diistributed Object Programming", Coputer, IEEE 2000, June, pp. 72-80.
McLellan, et al., "Building More Usable APIs", IEEE Software, pp. 78-86, May/Jun. 1998.
Saba—Products, Saba Enterprise 5, dated 1997-2006, 2 pages.
Saba—Company, dated 1997-2006, 1 page.
Saba—Solutions, Competency-Driven HCM, dated 1997-2006, 1 page.
Saba—Talent, dated 1997-2006, 2 pages.
Saba—Collaboration, dated 1997-2006, 1 page.
Stets, et al., "Component-Based APIs for Versioning and Distributed Applications", IEEE, pp. 54-61, 1999.
U.S. Appl. No. 10/325,465, Office Action dated Sep. 19, 2006, 25 pages.
U.S. Appl. No. 10/327,607, Office Action dated Apr. 18, 2006, 33 pages.
U.S. Appl. No. 10/328,920, Office Action dated May 31, 2006, 20 pages.
U.S. Appl. No. 10/345,879, Office Action dated Oct. 5, 2006, 30 pages.
U.S. Appl. No. 09/570,276, Office Action dated Mar. 25, 2003, 36 pages.
U.S. Appl. No. 09/570,276, Final Office Action dated Sep. 5, 2003, 24 pages.
U.S. Appl. No. 09/570,276, Advisory Action dated Nov. 17, 2003, 3 pages.
U.S. Appl. No. 09/570,276, Office Action dated Jan. 14, 2004, 17 pages.
U.S. Appl. No. 09/570,276, Office Action dated Sep. 13, 2004, 16 pages.
U.S. Appl. No. 09/570,276, Final Office Action dated Feb. 21, 2006, 17 pages.
U.S. Appl. No. 09/570,276, Office Action dated Nov. 14, 2006, 28 pages.
U.S. Appl. No. 09/570,276, Final Office Action dated Jul. 9, 2007, 16 pages.
U.S. Appl. No. 09/570,276, Office Action dated Oct. 2, 2007, 14 pages.
U.S. Appl. No. 10/314,888, Final Office Action dated Feb. 9, 2007, 34 pages.
U.S. Appl. No. 10/314,888, Office Action dated Jul. 27, 2007, 37 pages.
U.S. Appl. No. 10/325,465, Final Office Action dated Apr. 4, 2007, 25 pages.
U.S. Appl. No. 10/325,465, Advisory Action dated Jun. 19, 2007, 3 pages.
U.S. Appl. No. 10/325,465, Office Action dated Dec. 12, 2007, 20 pages.
U.S. Appl. No. 10/327,607, Final Office Action dated Oct. 10, 2006, 33 pages.
U.S. Appl. No. 10/327,607, Office Action dated Apr. 30, 2007, 33 pages.
U.S. Appl. No. 10/327,607, Final Office Action dated Nov. 16, 2007, 37 pages.
U.S. Appl. No. 10/328,920, Notice of Allowance dated Dec. 5, 2006, 8 pages.
U.S. Appl. No. 10/345,873, Notice of Allowance dated Jul. 6, 2006, 6 pages.
U.S. Appl. No. 10/345,879, Final Office Action dated May 17, 2007, 39 pages.
U.S. Appl. No. 10/345,879, Advisory Action dated Jul. 27, 2007, 5 pages.
U.S. Appl. No. 10/345,879, Office Action dated Oct. 31, 2007, 35 pages.
U.S. Appl. No. 10/354,914, Office Action dated Sep. 22, 2006, 8 pages.
U.S. Appl. No. 10/354,914, Final Office Action dated Apr. 5, 2007, 9 pages.
U.S. Appl. No. 10/684,796, Office Action dated Nov. 27, 2007, 25 pages.
U.S. Appl. No. 10/952,592, Final Office Action dated May 3, 2007, 54 pages.
U.S. Appl. No. 10/314,888, Final Office Action dated Feb. 22, 2008, 37 pages.
U.S. Appl. No. 10/327,607, Advisory Action dated Feb. 4, 2008, 3 pages.
U.S. Appl. No. 11/684,796, Final Office Action dated Jun. 17, 2008, 22 pages.
U.S. Appl. No. 10/327,607, Notice of Allowance dated Aug. 6, 2008, 36 pages.
U.S. Appl. No. 11/684,796, Advisory Action dated Aug. 13, 2008, 4 pages.

* cited by examiner

FIG. 3
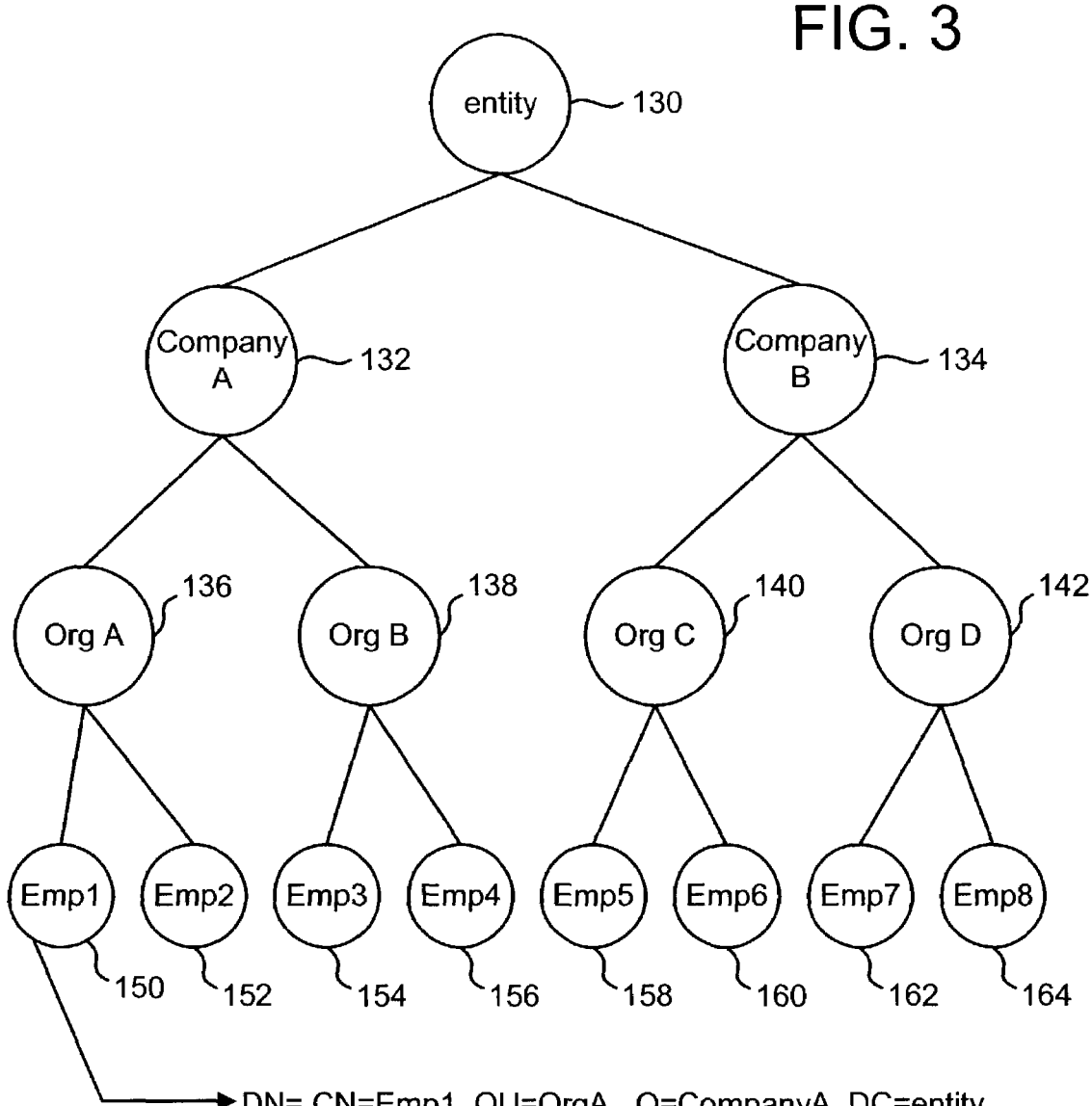
DN= CN=Emp1, OU=OrgA, O=CompanyA, DC=entity
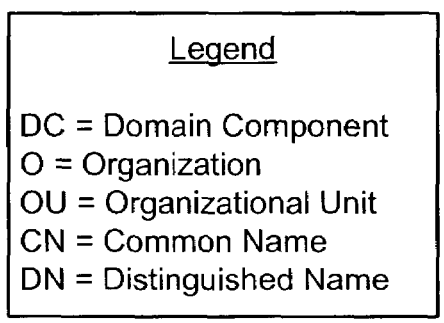

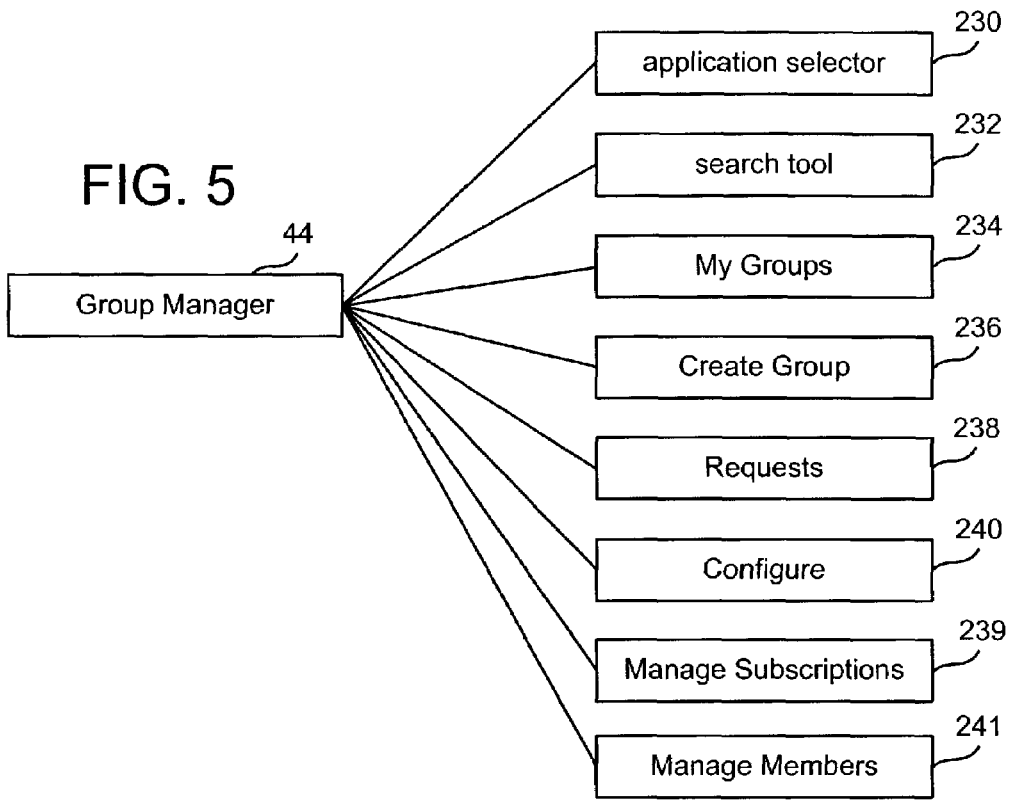
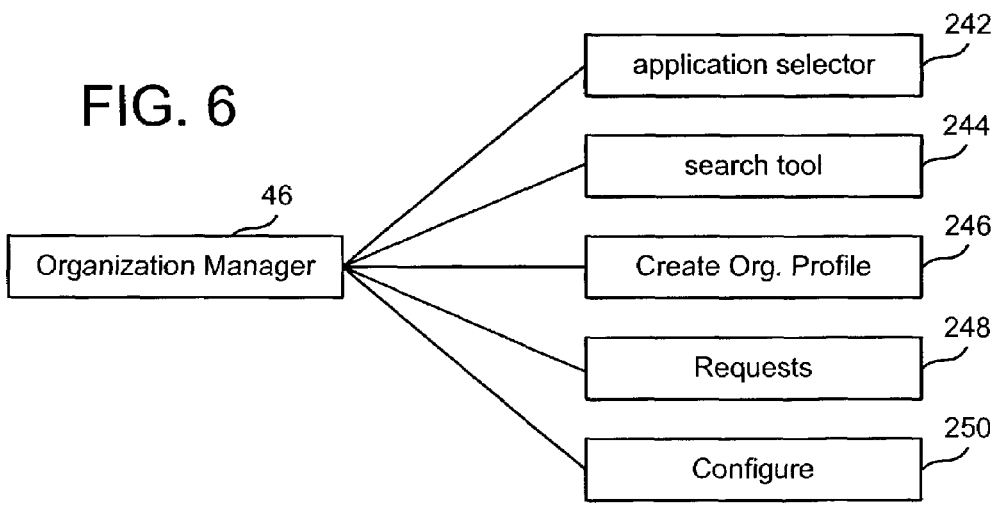

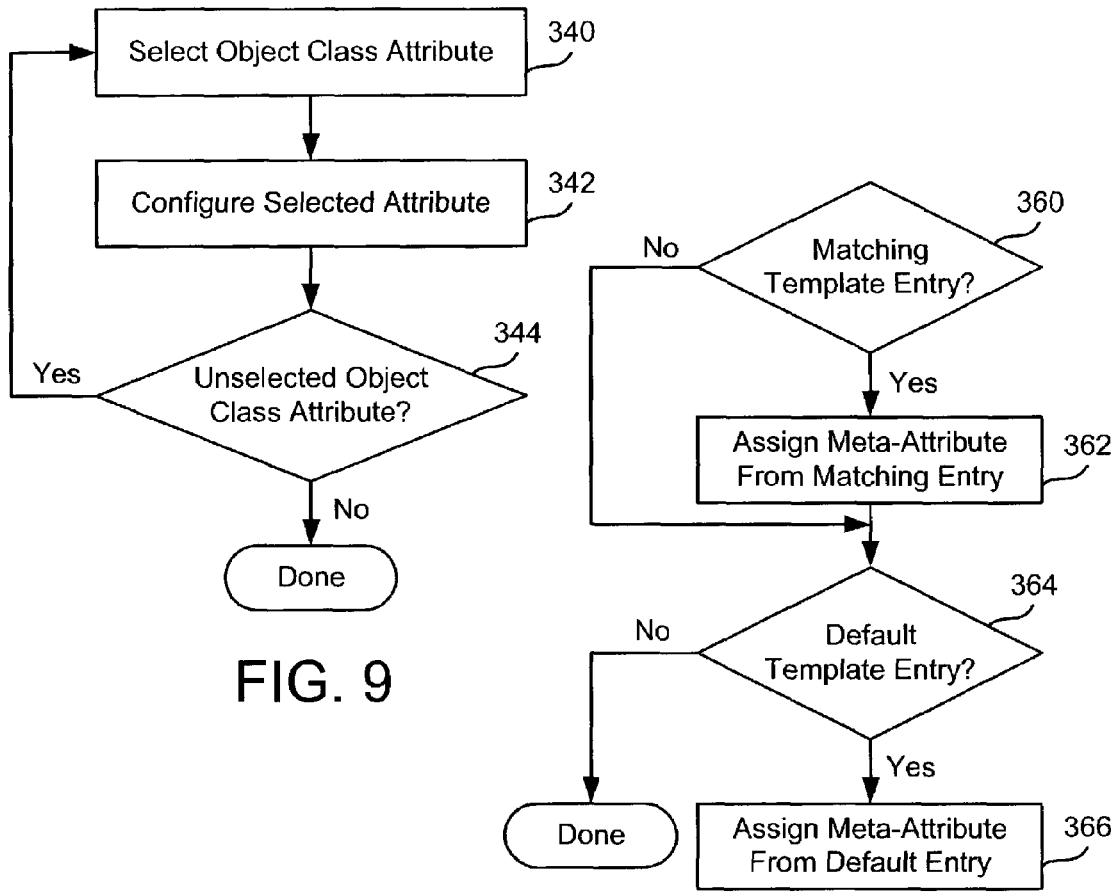
FIG. 9
FIG. 10
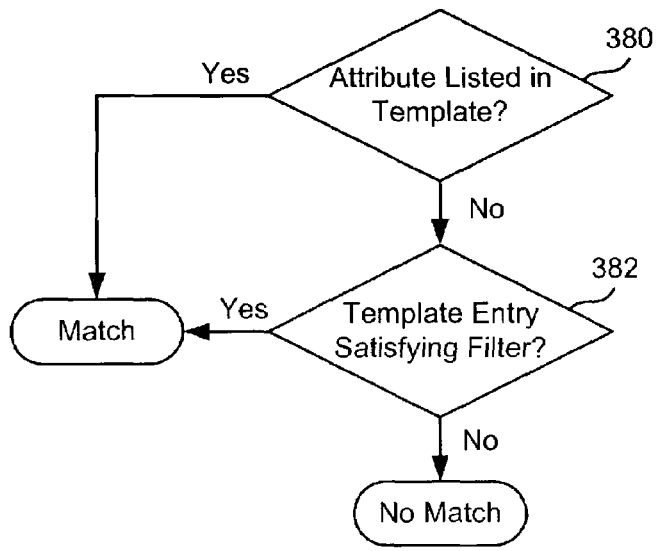
FIG. 11

AUTOMATIC CONFIGURATION OF ATTRIBUTE SETS

This application claims the benefit of U.S. Provisional Application No. 60/395,152, "Access and Identity System," filed on Jul. 11, 2002, which is incorporated herein by reference.

CROSS-REFERENCE TO RELATED APPLICATIONS

This Application is related to "Preparing Output XML Based on Selected Programs and XML Templates," by Michele C. Lee, U.S. patent application Ser. No. 09/997,410, filed Nov. 30, 2001, and incorporated herein by reference in its entirety.

BACKGROUND OF THE INVENTION

1. Field of the Invention

The present invention is directed to technology for automatically configuring object classes.

2. Description of the Related Art

With the growth of the Internet, the use of networks, and other information technologies, Identity Systems have become more popular. In general, an Identity System provides for the creation, removal, editing and other managing of identity information stored in various types of data stores. The identity information pertains to users, groups, organizations and/or things. For each entry in the data store, a set of attributes are stored. For example, the attributes stored for a user may include a name, address, employee number, telephone number, email address, user ID and password. The Identity System can also manage access privileges that govern what an entity can view, create, modify or use in the Identity System. Often, this management of access privileges is based on one or more specific attributes, membership in a group and/or association with an organization.

The data store often maintains attributes associated with an entity, such as a user, group, or organization, in an object that corresponds to the entity. For example, an object for a user may contain attributes for the user's name and login code. The Identity System often employs different classes of objects, with each class corresponding to a different type of entity. In one example, the Identity System employs different object classes for users, groups, and organizations. Each object in the user object class contains a set of attributes that correspond to a user. Each object in the group object class contains a set of attributes that correspond to a group. Each object in the organization object class contains a set of attributes that correspond to an organization.

The object classes employed in the data store may be used by many different systems and applications, in addition to the Identity System. The Identity System needs to have the object classes configured to support their use by the Identity System. In one example, the Identity System needs to associate meta-attributes with the attributes in an object class. The meta-attributes provide information the Identity System employs when using the object class attributes, such as an attribute's display name.

Traditionally, a system administrator manually configures object classes for the Identity System. The administrator informs the Identity System of each object class and configures each object class attribute—providing meta-attributes when necessary. The manual configuration is typically a tedious process that consumes a great deal of time. It is desirable for the configuration to be automated.

Some Identity System users also employ an Access Systems. An Access System provides for the authentication and authorization of users attempting to access resources. For efficiency purposes, there is an advantage to integrating the Identity System and the Access System. Additionally, integrating the Identity System and the Access System allows for single-sign-on functionality across multiple resources. Thus, there is also a need for Access Systems and integrated Identity/Access Systems to automatically configure object classes. Systems other than Identity and Access Systems can also benefit from automatically configuring object classes. Automated object class configuration can benefit any application or system that needs to interface with data store object classes.

SUMMARY OF THE INVENTION

The present invention, roughly described, pertains to technology for automatically configuring attribute sets, such as object classes. In one implementation, an Identity System configures an object class, based on a template for the object class. The template includes entries that identify attributes for the object class. In one embodiment, each entry identifies an attribute and a corresponding meta-attribute. In alternate embodiments, the template may support multiple objects and include entries with different types of information.

The Identity System identifies a template that corresponds to the object class being configured. The Identity System also retrieves schema information for the object class. In one implementation, the schema information identifies the attributes for the object class. The Identity System uses the schema information and template to configure the object class.

During configuration, the Identity System selects an attribute in the object class and identifies a corresponding template entry. The Identity System configures the attribute, based on the information in the template entry. In one embodiment, the template entry identifies a meta-attribute for the selected attribute, and the Identity System assigns the meta-attribute to the selected attribute in the object class. The Identity System repeats this procedure for each attribute in the object class.

Different embodiments employ a variety of techniques to identify template entries that correspond to a selected attribute. In one instance, the Identity System attempts to identify a template entry with a name that matches the corresponding attribute. A match can be found when the names are identical or have a desired level of similarity. If there is not a match, the Identity System employs a default template entry with generic configuration information.

Various embodiments of the present invention are incorporated in an Identity, Access, or integrated Identity/Access System. Further embodiments, however, are employed in systems other than Identity, Access, and integrated Identity/Access Systems. Further implementations of the invention provide for configuring attribute sets other than object classes. One embodiment configures classes of tables in a database—configuring attributes in a class of database table using a template.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software implementing the present invention is used to program one or more processors. The processors can be in communication with one or more storage devices, peripherals and/or communication interfaces.

These and other objects and advantages of the present invention will appear more clearly from the following description in which the preferred embodiment of the invention has been set forth in conjunction with the drawings.

BRIEF DESCRIPTION OF THE DRAWINGS

FIG. 3 is an example of a directory tree structure.

FIG. 5 is a block diagram depicting the Group Manager.

FIG. 6 is a block diagram depicting the Organization Manager.

FIG. 9 is a flowchart depicting one embodiment of a process for configuring object class attributes.

FIG. 10 is a flowchart depicting one embodiment of a process for configuring a selected attribute in an object class.

FIG. 11 is a flowchart depicting one embodiment of a process for determining whether a template includes an entry matching a selected attribute in an object class.

DETAILED DESCRIPTION

Figure 1:
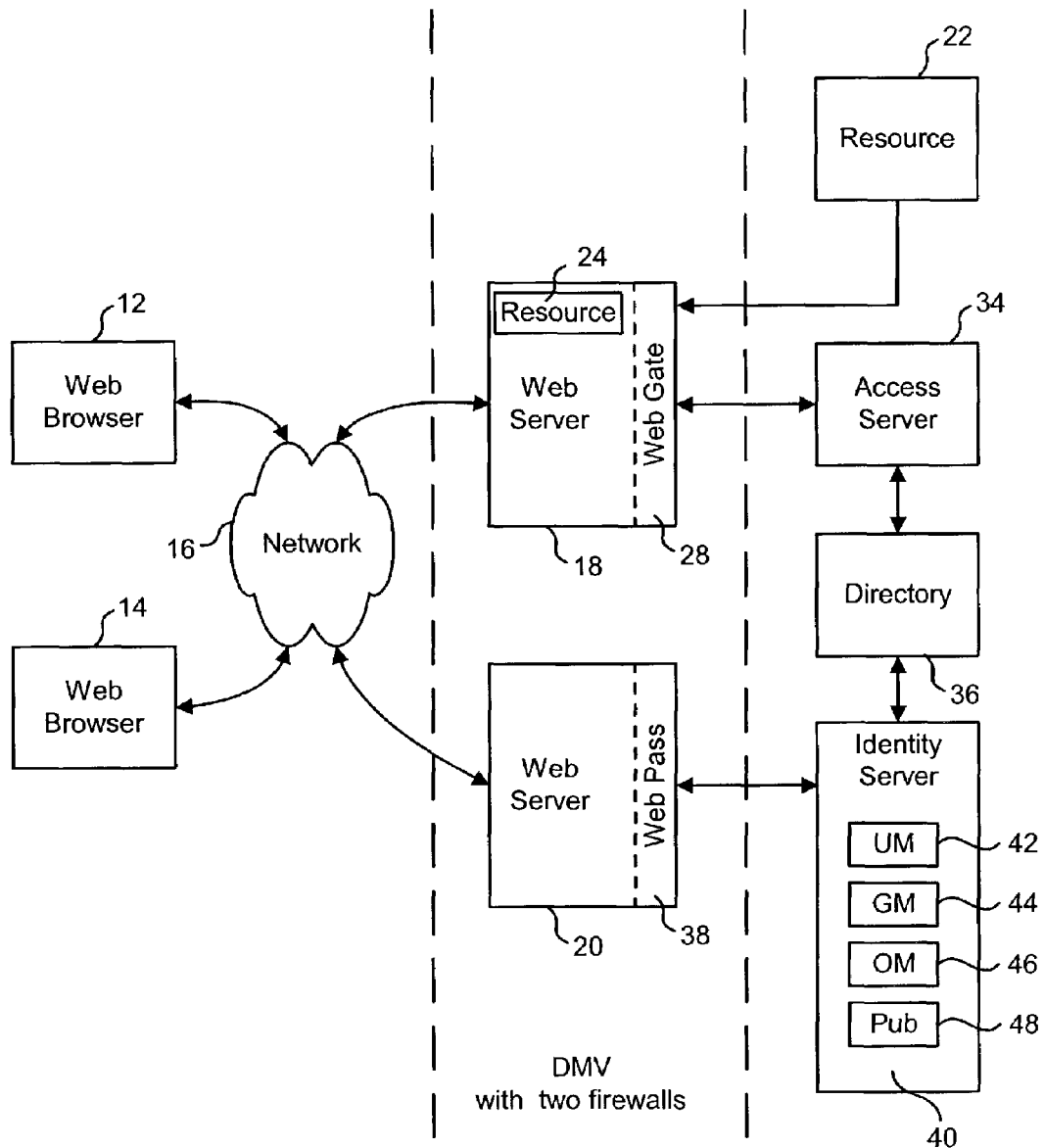
FIG. 1 is a block diagram depicting the components of one embodiment of the present invention.

FIG. 1 depicts an example of an access management system that provides identity management services and/or access management services for a network. The identity management portion of the system (referred to as "the Identity System") manages identity profiles, while the access management portion of the system (referred to as "the Access System") provides security for resources across one or more Web Servers (or other components). A key feature of one embodiment of this system is the centralization of the repositories for policies and identity profiles, while decentralizing their administration. That is, one embodiment of the system centralizes the policy and identity repositories by building them on a directory service technology. The system decentralizes their administration by hierarchy delegating administrative roles. Although the system of FIG. 1 includes an Identity System and an Access System, other embodiments may only include an Identity System or only include an Access System.

FIG. 1 is a block diagram depicting one embodiment for deploying an integrated Identity System and Access System. FIG. 1 shows web browsers 12 and 14 accessing Web Server 18 and/or Web Server 20 via network 16. One example of a network is the Internet. In one embodiment, web browsers 12 and 14 are standard web browsers known in the art running on any suitable type of computer. FIG. 1 depicts web browsers 12 and 14 communicating with Web Server 18 and Web Server 20 using HTTP over the Internet; however, other protocols and networks can also be used.

Web Server 18 is a standard Web Server known in the art and provides an end user with access to various resources via network 16. One embodiment includes two firewalls. A first firewall (see dotted lines) is connected between network 16 and Web Server 18. A second firewall (see dotted lines) is connected between Web Servers 16 and 18 and Access Server 34/Identity Server 40.

FIG. 1 shows two types of resources: resource 22 and resource 24. Resource 22 is external to Web Server 18 but can be accessed through Web Server 18. Resource 24 is located on Web Server 18. A resource can be anything that is possible to address with a uniform resource locator (URL, see RFC 1738). A resource can include a web page, software application, file, database, directory, data unit, etc. In one embodiment, a resource is anything accessible to a user via a network. The network could be the Internet, a LAN, a WAN, or any other type of network.

FIG. 1 shows Web Server 18 including Web Gate 28, which is a software module. In one embodiment, Web Gate 28 is a plug-in to Web Server 18. Web Gate 28 communicates with Access Server 34. Access Server 34 communicates with Directory 36.

The Access System includes Access Server 34, Web Gate 28, and Directory 36. Access Server 34 provides authentication, authorization, auditing and logging services. It further provides for identity profiles to be used across multiple domains and for access based on a single web-based authentication (sign-on). Web Gate 28 acts as an interface between Web Server 18 and Access Server 34. Web Gate 28 intercepts requests from users for resources 22 and 24, and authorizes them via Access Server 34. Access Server 34 is able to provide centralized authentication, authorization, and auditing services for resources hosted on or available to Web Server 18 and other Web Servers.

The Identity System includes Web Pass 38, Identity Server 40 and Directory 36. Identity Server 40 manages identity profiles. An identity profile is a set of information associated with a particular entity (e.g. user, group, organization, etc.). The data elements of the identity profile are called attributes. An attribute may include a name, a value and access criteria. The Identity Server includes three main applications, which effectively handle the identity profiles and privileges of the user population: User Manager 42, Group Manager 44, and Organization Manager 46. User Manager 42 manages the identity profiles for individual users. Group Manager 44 manages identity profiles for groups. Organization Manager 46 manages identity profiles for organizations. Identity Server 40 also includes Publisher 48, an application that enables entities to quickly locate and graphically view information stored by Directory 36. In one embodiment, Web Pass 38 is a Web Server plug-in that sends information back and forth between Identity Server 40 and the Web Server 20, creating a three-tier architecture. The Identity System also provides a Certificate Processing Server (not shown in FIG. 1) for managing digital certificates.

User Manager 42 handles the functions related to user identities and access privileges, including creation and deletion of user identity profiles, modification of user identity profile data, determination of access privileges, and credentials management of both passwords and digital certificates. With User Manager 42, the create, delete, and modify functions of user identity management can be set as flexible, multi-step workflows. Each business can customize its own approval, setup, and management processes and have multiple processes for different kinds of users.

Group Manager 44 allows entities to create, delete and manage groups of users who need identical access privileges to a specific resource or set of resources. Managing and controlling privileges for a group of related people—rather than handling their needs individually—yield valuable economies of scale. Group Manager 44 meets a wide range of e-business needs: easy creation, maintenance, and deletion of permanent and ad hoc groups of users who may be allowed or denied access to particular resources; modification and adaptation of groups and their access privileges with minimal disruption to the directory server's underlying schema; efficient addition and deletion of users from established groups; and delegation of administrative responsibility for group membership and subscription requests and approvals.

With Group Manager 44, companies (or other entities) can allow individual users to do the following: (1) self-subscribe to and unsubscribe from groups, (2) view the groups that they are eligible to join or have joined, and (3) request subscription to groups that have access to the applications they need. Multi-step workflows can then define which users must obtain approval before being added to a group and which can be added instantly. Group Manager 44 also lets organizations form dynamic groups specified by an LDAP filter. The ability to create and use dynamic groups is extremely valuable because it eliminates the administrative headache of continually keeping individual, static membership up-to-date. With dynamic group management features, users can be automatically added or removed if they meet the criteria specified by the LDAP filter. Dynamic groups also greatly enhance security since changes in user identities that disqualify someone from membership in a group are automatically reflected in the dynamic group membership.

The third application in the Identity System, Organization Manager 46, streamlines the management of large numbers of organizations within an e-business network, including partners, suppliers, or even major internal organizations such as sales offices and business units. Certain infrastructure security and management operations are best handled—or can only be handled—at the highest organizational unit level rather than at the individual or group level. Like User Manager and Group Manager, this application relies on multi-step workflow and delegation capabilities. Organization Manager handles the following administrative tasks: (1) organization lifecycle management, whereby companies can create, register, and delete organizations in their systems using customizable workflows; (2) maintenance of organization profiles on an attribute-by-attribute basis through self-service, delegated administration and system-initiated activities; (3) organization self-registration, whereby organizations such as business partners, customers and suppliers can self-generate a request to be added to the e-business network; and (4) creation of reusable rules and processes through multi-step workflows.

The various components of FIG. 1 can be implemented by software running on computing devices. Many different types of computing devices can be used, including servers, mainframes, minicomputers, personal computers, mobile computing devices, etc. Typically, such computing devices will have one or more processors that are programmed by code that is stored in one or more processor readable storage devices. The one or more processors are in communication with the processor readable storage devices, peripherals (e.g. keyboards, monitors, pointing devices, printers, etc.) and communication interfaces (e.g. network interfaces, modems, wireless transmitters/receivers, etc.).

The system of FIG. 1 is scalable. There can be many Web Servers, many Access Servers, and many Identity Servers. In one embodiment, Directory 36 is a Directory Server and communicates with other servers/modules using LDAP or LDAP over SSL. In other embodiments, Directory 36 can implement other protocols or can be other types of data repositories (e.g. relational database using SQL, etc.). Many variations of the system of FIG. 1 can be used with the present invention. For example, instead of accessing the system with a web browser, an API can be used. Alternatively, portions of functionality of the system at FIG. 1 can be separated into independent programs that can be accessed with a URL.

To understand how the system of FIG. 1 protects a resource, first consider the operation of unprotected resources. With a typical unprotected resource, end users cause their browsers to send a request to a Web Server. The request is usually an HTTP request, which includes a URL. The Web Server then translates, or maps, the URL into a file system's name space and locates the matching resource. The resource is then returned to the browser.

With the system of FIG. 1 deployed, Web Server 18 (enabled by Web Gate 28, Access Server 34, and Directory 36) can make informed decisions based on default and/or specific rules about whether to return requested resources to an end user. The rules are evaluated based on the end user's identity profile, which is managed by the Identity System. In one embodiment of the present invention, the general method proceeds as follows. An end user enters a URL or an identification of a requested resource residing in a protected policy domain. The user's browser sends the URL as part of an HTTP request to Web Server 18. Web Gate 28 intercepts the request. If the end user has not already been authenticated, Web Gate 28 causes Web Server 18 to issue a challenge to the browser for log-on information.

The received log-on information is passed back to Web Server 18 and on to Web Gate 28. Web Gate 28 in turn makes an authentication request to Access Server 34, which determines whether the user's supplied log-on information is authentic or not. Access Server 34 performs the authentication by accessing attributes of the user's identity profile and the resource's authentication criteria stored on Directory 36. If the user's supplied log-on information satisfies the authentication criteria, the process flows as described below; otherwise, the end user is notified that access to the requested resource is denied and the process halts.

After authenticating the user, Web Gate 28 queries Access Server 34 about whether the user is authorized to access the resource requested. Access Server 34 in turn queries Directory 36 for the appropriate authorization criteria for the requested resource. Access Server 34 retrieves the authorization criteria for the resource and answers Web Gate 28's authorization query, based on the resource's authorization criteria and the user's identity profile. If the user is authorized, the user is granted access to the resource; otherwise, the user's request is denied. Various alternatives to the above described flow are also within the spirit and scope of the present invention.

Authentication and Authorization decisions are based on policy domains and policies. A policy domain is a logical grouping of Web Server host ID's, host names, URL prefixes, and rules. Host names and URL prefixes specify the course-grain portion of the web name space a given policy domain protects. Rules specify the conditions in which access to requested resources is allowed or denied, and to which end users these conditions apply. Policy domains contain two levels of rules: first level default rules and second level rules contained in policies. First level default rules apply to any resource in a policy domain not associated with a policy.

A policy is a grouping of a URL pattern, resource type, operation type (such as a request method), and policy rules. These policy rules are the second level rules described above. Policies are always attached to a policy domain and specify the fine-grain portion of a web name space that a policy protects. In practice, the host names and URL prefixes from the policy's policy domain are logically concatenated with the policy's URL pattern. The resulting overall pattern is compared to the incoming URL. If there is a match, then the policy's various rules are evaluated to determine whether the request should be allowed or denied; if there is not a match, then default policy domain rules are used.

Figure 2:
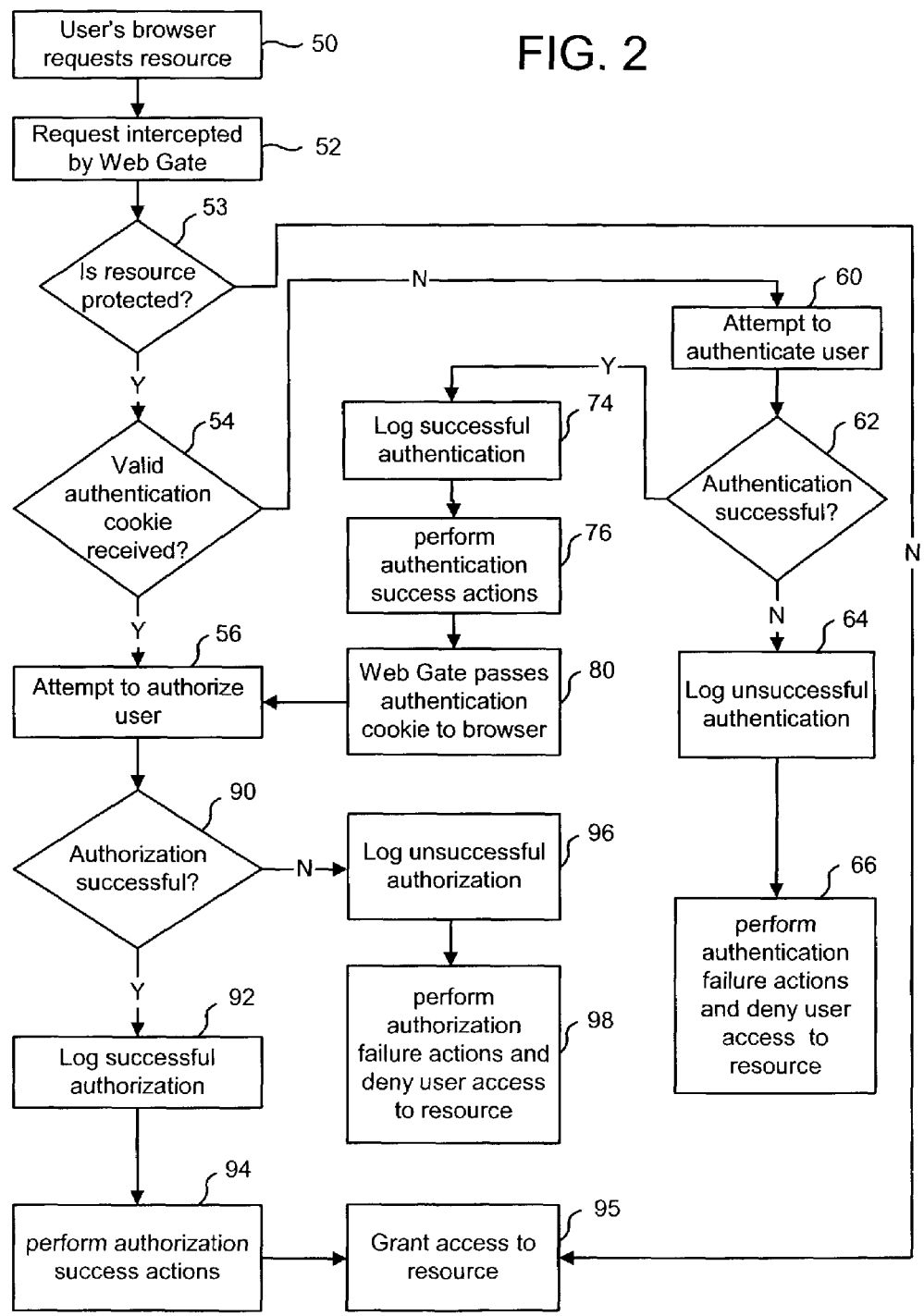
FIG. 2 is a flow chart describing one embodiment of a process for authenticating and authorizing.

FIG. 2 provides a flow chart for one embodiment of a method for authenticating and authorizing. A user's browser 12 requests a web-enabled resource 22 or 24 (step 50). The request is intercepted by Web Gate 28 (step 52). The method then determines whether the requested resource is protected by an authentication and/or authorization rule (step 53). If the resource is not protected, then access is granted to the requested resource (step 95). If the requested resource is protected, however, the method proceeds to step 54. If the user was previously authenticated for a protected resource in the same domain, a valid authentication cookie is passed by browser 12 with the request in step 50. The authentication cookie is intercepted by Web Gate 28 in step 52. If a valid cookie is received (step 54), the method attempts to authorize the user (step 56). If no valid authentication cookie is received (step 54), the method attempts to authenticate the user for the requested resource (step 60).

If the user successfully authenticates for the requested resource (step 62), then the method proceeds to step 74. Otherwise, the unsuccessful authentication is logged (step 64). After step 64, the system performs authentication failure actions and Web Gate 28 denies the user access to the requested resource (step 66). In step 74, the successful authentication of the user for the resource is logged. The method then performs authentication success actions (step 76). In response to the successful authentication, Web Gate 28 then passes a valid authentication cookie to browser 12 (step 80), which stores the cookie. After passing the cookie in step 80, the system attempts to authorize (step 56).

In step 56, the method determines whether the user is authorized to access the requested resource. If the user is authorized (step 90), the method proceeds to step 92. Otherwise, the unsuccessful authorization is logged (step 96). After step 96, the method performs authorization failure actions (step 98) and Web Gate 28 denies the user access to the requested resource. If authorization is successful (step 90), then the successful authorization of the user is logged (step 92). Authorization success actions are performed in step 94. The user is granted access to the requested resource (step 95). In one embodiment of step 95, some or all of HTTP request information is provided to the resource. In one or more scenarios, the resource being accessed is the Identity System.

More information about authorization, authentication, an Access System and an Identity System can be found in U.S. patent application Ser. No. 09/997,410, "Preparing Output XML Based on Selected Programs and XML Templates," filed on Nov. 30, 2001, which is incorporated herein by reference in its entirety.

Both the Identity System and the Access System make use of Directory 36. The basic unit of information store in Directory 36 is called a object, entry or identity profile, which is a collection of information about an entity. The information in an entry often describes a real-world entity such as a person, but this is not required. A typical directory includes many entries that correspond to people, departments, groups and other entities in the organization served by the directory. An object is composed of a set of attributes, each of which describes one particular trait of the entity. In one implementation, each attribute has a type, one or more values, and associated access criteria. The type describes the kind of information contained in the attribute, and the value contains the actual data.

An entry in the directory has a set of attributes that are required and a set of attributes that are allowed. For example, an entry describing a person may be required to have a cn (common name) attribute and an sn (surname) attribute in one embodiment. One example of an allowed attribute may be a nickname. Any attribute not explicitly required or allowed is prohibited.

Examples of attributes stored in a user identity profile include: first name, middle name, last name, title, email address, telephone number, fax number, mobile telephone number, pager number, pager email address, identification of work facility, building number, floor number, mailing address, room number, mail stop, manager, direct reports, administrator, organization that the user works for, department number, department URL, skills, projects currently working on, past projects, home telephone, home address, birthday, previous employers and anything else desired to be stored by an administrator. Examples of attributes stored in a group identity profile include: owner, name, description, static members, dynamic member rule, subscription policies, etc. Examples of attributes stored in a user organization identity profile include: owner, name, description, business category, address, country, etc. In other embodiments, less or more than the above-listed information is stored.

FIG. 3 depicts an exemplar directory tree that can be stored in Directory 36. Each node on the tree is an object in the directory structure that serves as an identity profile. In one embodiment, the entity can be a user, group or organization. Node 230 is the highest node on the tree and represents an entity responsible for the directory structure. In one example, an entity may set up an Extranet and grant Extranet access to many different companies. The entity setting up the Extranet is node 130. Each of the companies with Extranet access would have a node at a level below node 130. For example, company A (node 132) and company B (node 134) are directly below node 130. Each company may be broken up into organizations. The organizations could be departments in the company or logical groups to help manage the users. For example, FIG. 3 shows company A broken up into two organizations: organization A with node 136 and organization B with node 138. Company B is shown to be broken up into two organizations: organization C with node 140 and organization D with node 142. FIG. 3 shows organization A having two end users: employee 1 with node 150 and employee 2 with node 152. Organization B is shown with two end users: employee 3 with node 154 and employee 4 with node 156. Organization C is shown with two end users: employee 5 with node 158 and employee 6 with node 160. Organization D is shown with two end users: employee 7 with node 162 and employee 8 with node 164.

Each entity has a distinguished name (DN), which uniquely identifies the node. In one embodiment, each entry also has a relative name, which is different from all other relative names on the same level of the hierarchy. In one implementation, the distinguished name (DN) comprises a union of the relative names up the tree. For example, the distinguished name of employee 1 (node 150) is DN=CN=Empl, OU=OrgA, O=CompanyA, DC=entity, where:

| | | |
|---|---|---|
| DC | = | Domain Component |
| O | = | Organization |
| OU | = | Organizational Unit |
| CN | = | common name. |

FIG. 3 shows a hierarchical tree. Some organizations employ fat or flat trees for ease of maintenance. A flat directory tree is a directory information tree that does not have any hierarchy. All of the nodes are leaf nodes (nodes without any child nodes). A fat directory tree is a tree that has a large number of nodes at any given level in a directory information tree. One advantage of a fat or flat tree is user maintenance. For example, if an employee moves to a new group, the node must be moved to a new container if the tree is not flat or fat. By moving the node to a new container, the distinguished name for the node changes and all certificates become void. One drawback of flat or fat trees is that the organization loses the benefits of having a logical directory, such as using the logical directory to determine who has access to which nodes. To remedy this, the Identity System includes partition support for fat and flat tree directories using filters. From a configuration page, an attribute can be configured to be accessible (read, modify, etc.,) based on a two part filter. The first component in the filter identifies a top node in the directory. The filter will only apply to those entities at or below that top node. The second component of the filter is an LDAP filter which defines who can access the attribute. This two component filter can be applied on an attribute by attribute basis.

There are many ways for an entity to access and use the Identity System. In one embodiment, the entity can access the Identity System's services using a browser. In other embodiments, XML documents and API's can be used to access the services of the Identity System. For example, an entity can use a browser by pointing the browser to Identity Server 40. The user will then be provided with a login page to enter the user's ID, password, type of user and application requested (optional). Upon filling out that information, the user will be authenticated and authorized (by the Access System) to use the Identity System. Alternatively, the Access System can be bypassed (or there may be no Access System) and the Identity System authenticates the user.

As described above, the Identity System of FIG. 1 includes User Manager 42, Group Manager 44 and Organization Manager 46. User Manager 42 manages identity profiles for users. Group Manager 44 manages identity profiles for groups. Organization Manager 46 manages identity profiles for organizations. Each of these components will now be described in more detail.

Figure 4:
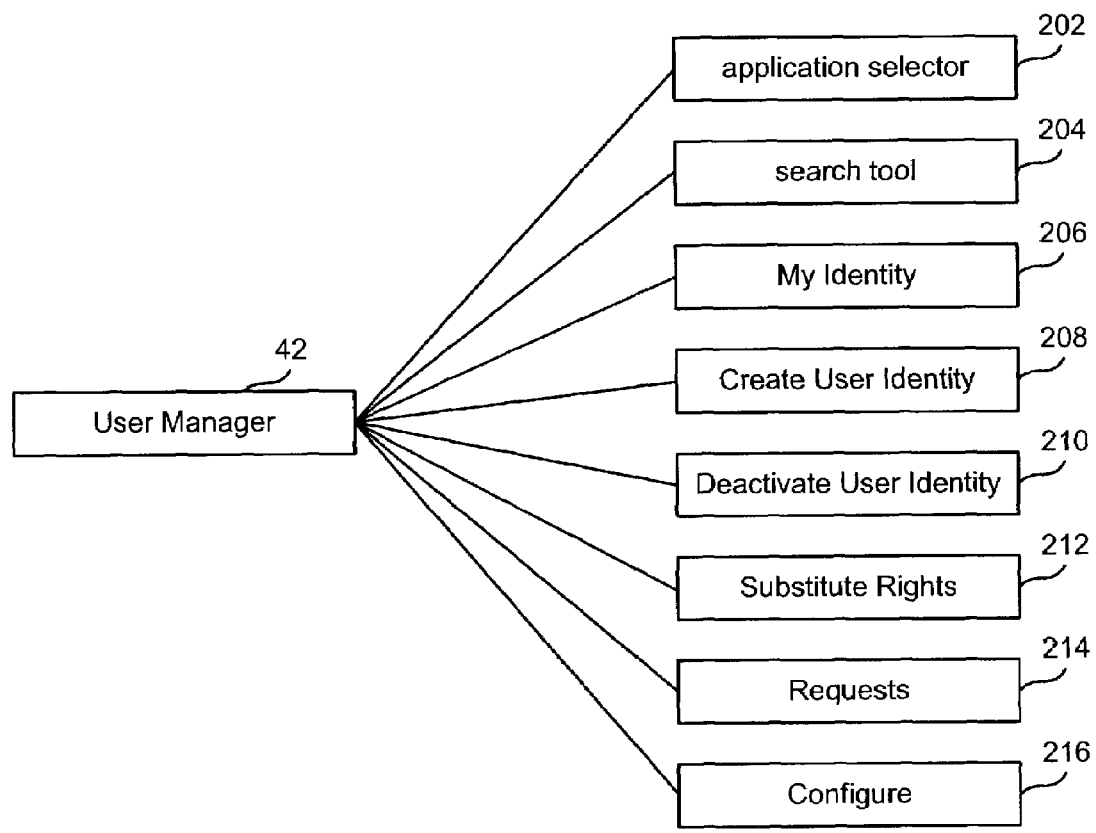
FIG. 4 is a block diagram depicting the User Manager.

FIG. 4 graphically depicts the various services provided by User Manager 42. Each of these services can be accessed from a User Manager home page. For example, in one embodiment, the home page will include application selector 202, search tool 204, My Identity tab 206, Create User Identity tab 208, Deactivate User Identity tab 210, Substitute Rights tab 212, Requests tab 214 and Configure tab 216. Application selector 202 lets the user change applications from the User Manager to either the Group Manager, Object Manager or Publisher. In one embodiment, application selector 202 is a drop down menu. Search tool 204 enables a user to provide search information in order to search the directory for a set of one or more user identity profiles.

By selecting My Identity tab 206, a user is provided with the information stored in that user's identity profile. Create User Identity tab 208 allows a user with the appropriate privileges to create a new user identity profile (e.g. with a workflow). Deactivate User Identity tab 210 allows a user with proper privileges to remove an identity profile from the directory. Substitute Rights tab 212 allows the user to indicate who can proxy that user and allows the user to be a proxy for someone else. Request tab 214 allows a user to monitor workflows that are in progress or recently completed. Depending on the user's privileges, by selecting request tab 214, the user can see all workflows that involve that user, that are started by that user, that affect that user or that the user has privileges to view. Request tab 214 will indicate workflows for which there is an outstanding action to be done by the current user. The user can select that workflow and perform the task.

Configure tab 216 allows a user to configure various options for User Manger 42. The user must have sufficient privileges to access Configure tab 216. The user can perform attribute access control, delegate administration, define workflows and set the search base. Attribute access control includes controlling who has view and modify permissions for each attribute. Attributes can be set at any and all levels in an organization. The configuration also allows the specification of an e-mail notification list when a change to an attribute is requested. Delegation administration includes delegating administrative tasks to local administrators. An entity can choose what rights to delegate, whom to delegate to, and the scope to delegate. Workflow definition includes defining workflows for a particular organization, defining who will be responsible for the workflow actions and/or defining who will be receiving notifications for the workflow actions. Setting the search base includes setting the search base for a particular organization, person or set of persons. This will localize access to ensure security.

FIG. 5 depicts the various services provided by Group Manager 44. Once an entity is at the Group Manager home page, the entity can access application selector 230, search tool 232, My Groups tab 234, Create Groups tab 236, Request tab 238, Manage Subscriptions tab 239, Configure tab 240, and Manage Members tab 241. My Groups tab 234 indicates the groups of which the entity is a member. By selecting any of the groups identified by My Groups tab 234 or Search Tool 232, the user will be provided with the identity profile page for that particular group. From the profile page, the group can be modified or deleted. Create groups tab 236 allows the user to create a new group. Request tab 238 provides the user with access to currently pending and recently finished workflows that involve groups. Configure tab 240 allows the user to configure various information about groups in the Group Manager. While viewing the identity profile for a group, the entity can modify that profile if the entity has appropriate privileges.

Configure tab 240 allows an entity to provide attribute access control, delegate rights, define workflows and expand dynamic groups. Attribute access control includes controlling who has view and modify permissions for each attribute in group identity profiles. Additionally, e-mail notification lists can be created which are used to notify entities when a change to an attribute is requested. Administration tasks can be delegated to local administrators. An entity can choose what rights to delegate, who to delegate to, and what the scope of the delegation is. Workflow definition includes defining the workflows for a particular group. This includes defining who is responsible for the workflow actions and who will be receiving notifications for workflow actions. Note that some of the tabs and services may not be available to all entities, depending upon the privileges of those entities. Manage Subscriptions tab 239 allows users to subscribe to groups or unsubscribe from groups. Manage Members tab 241 allows users to view, add, remove, and search members of a group.

FIG. 6 depicts the services provided by Organization Manager 46. Organization manager 46 provides functionality to create, modify, delete and manage organizational objects. From the home page for Organization Manager 46, a user is provided with application selector 242, search tool 244, Create Organizational Profile tab 246, Request tab 248 and Configure tab 250. Application selector 242 allows the user to select a different application to access. Search tool 244 provides a user with the ability to enter search terms in order to search for one or more organizational objects. After performing a search, the user will be provided with a list of organizational objects meeting the search requirements. User can select any of these objects to view, modify or delete, if the user has sufficient privileges.

Create Organizational Profile tab 246 allows a user to create new organizational objects, if the user has sufficient privileges. Request tab 248 allows a user to access pending workflows and workflows that have recently been finished that relate to organizational objects. Access to Request tab 248 can be restricted and/or limited depending upon users privileges. If a user has a step to perform for a workflow, it will be indicated by Request tab 248.

Configure tab 250 allows the entity to perform attribute access control, delegate administration, define workflows and define container limits. Attribute access control includes controlling who has view and modify permissions for each attribute of an organizational identity profile. In addition, an entity can specify an e-mail notification list when a change to an attribute is requested. Delegating administration includes delegating administrative tasks to local administrators. An entity can choose what rights to delegate, whom to delegate to, and the scope of the delegation. Workflow definition includes defining the workflows for a particular organization, including who will be responsible for the workflow actions and who will be receiving notifications for the workflow. Container limits includes controlling how many objects can be created in an organization. This would also include defining who will be receiving notifications that a container limit has been met, has been violated or is close to being met.

Figure 7:
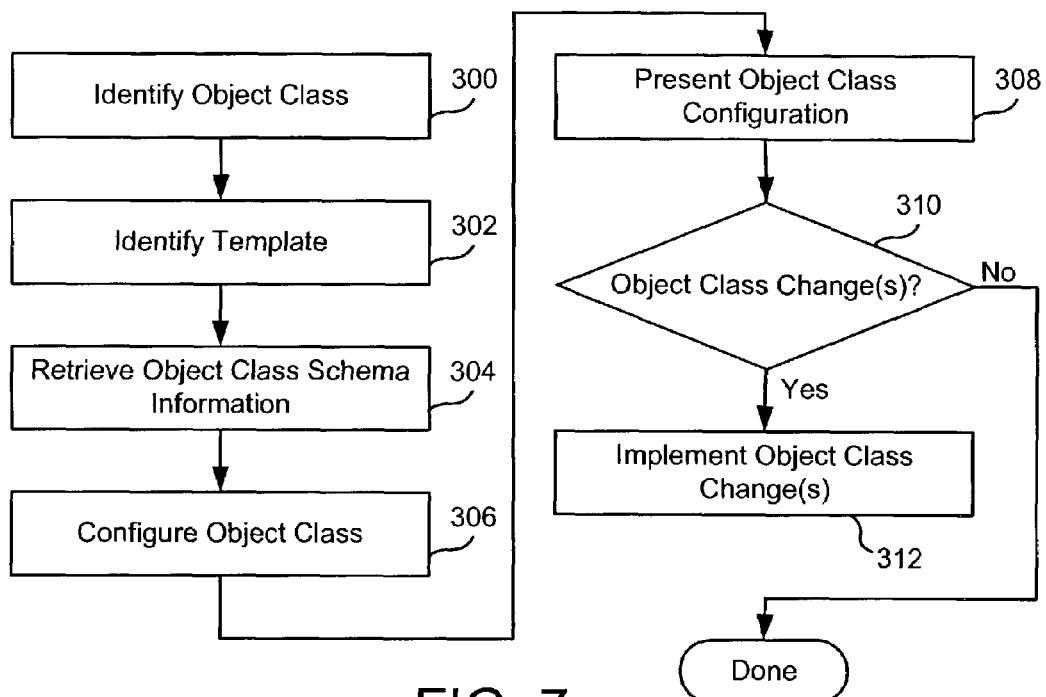
FIG. 7 is a flowchart depicting one embodiment of a process for automatically configuring an object class.

FIG. 7 depicts a flowchart for one embodiment of a process for automatically configuring an object class. As shown in FIG. 3, objects can be used to represent a number of different things. A different type of object is used for each different type of thing being represented. Each different object type is referred to as an object class. For example, node 150 in FIG. 3 is an object for employee 1 with a user object class format—including all of the attributes specified by the user object class. In some implementations, the Identity System may employ only a single user class for all user objects. Alternatively, the Identity System may employ different types of user object classes for different users. The Identity System also includes a group object class that identifies the format for all group objects in one embodiment. Another object class example is an organization object classes used for objects that represent an organization. Any type of information stored by the Identity System in Directory 36 can be classified as an attribute belonging to an object class and stored in an object that conforms to the class format.

The object classes supported in Directory 36 need to be configured for use with the Identity System. The automatic configuration provided by the process shown in FIG. 7 alleviates the need for a system administrator to manually configure the object classes. This speeds up the configuration process and reduces costs associated with dedicating system administrator time to the configuration task. The process in FIG. 7 is described with respect to configuring object classes for the Identity System. Those skilled in the art will recognize that the process shown in FIG. 7 also applies to configuring object classes for use with other applications and systems. For example, the process shown in FIG. 7 can apply to configuring object classes for an integrated Identity/Access System or an Access System. Alternatively, the process shown in FIG. 7 can be employed with systems and applications completely unrelated to either Identity Systems or Access Systems.

The Identity System identifies an object class supported by Directory 36 for configuration (step 300). In one implementation, the Identity System queries a system administrator or other user for the name of an object class to be configured. In other embodiments, many different techniques can be used for identifying object classes that need configuration. For example, the Identity System may select an object class from a list of object classes to be configured. In one implementation, only a single object class can be identified for each type of object. For example, the Identity System will only recognize one user object class and one group object class. In alternate embodiments, multiple object classes can be configured for a single type of object.

The Identity System identifies a template that corresponds to the identified object class (step 302). A template contains entries that correspond to attributes in the identified object class. In one implementation, a template only includes attributes that are meant to correspond to one object class. Alternatively, a template can include attributes for multiple object classes. In one embodiment, the Identity System only has access to a single template that contains a list of attributes to employ across multiple object classes. Any set of configuration information for an object class or attributes in an object class can be employed as a template. A template may also include multiple sets of configuration information. In one format, a template entry includes an attribute identifier, such as an attribute name or unique code, and a meta-attribute for the identified attribute. A meta-attribute provides information used by the Identity System when employing the associated attribute. Alternatively, each entry can include additional information that corresponds to an attribute.

In one embodiment, a meta-attribute includes the following components: 1) cardinality—identifying whether one or multiple values are associated with the attribute; 2) display name—identifying a name to be displayed on a graphical user interface to describe the attribute; 3) display type—identifying a display format for the attribute's display name; 4) searchable—indicating whether a user can perform a search, based on the associated attribute; 5) version—identifying the version of the Identity System software; 6) visible—indicating whether the attribute can be viewed; 7) semantic type—identifying any action or special meaning associated with the attribute. The Identity System employs the semantic type to associate additional meaning with the attribute. For example, when the semantic type is "Login," the Identity System recognizes that the attribute contains a login identifier and employs the attribute whenever a login identifier is required. The above list only represents one example of a meta-attribute. Further embodiments employ different meta-attributes.

In one implementation of step 302, the Identity System identifies a corresponding template based on the template's name. Matching a template name to an object class name can be useful when Directory 36 employs standard directory server software with well-known object class names. Examples of such directory server software include products provided by Netscape, Novell, and Microsoft. One example of a well-known name for a user object class is InetOrgPerson. In a matching implementation, the Identity System looks for a template with an identifier corresponding to the InetOrgPerson name.

Different techniques can be employed for identifying a template that corresponds to the identified object class. For example, the Identity System can try to identify a template with a name that has a predefined level of similarity to the object class name. The Identity System can alternatively try to identify a template with entries for a predetermined number of attributes that correspond to the attributes identified in the object class. In some instances, the selected object class may be non-standard and customized—making its name unknown to the Identity System. In order to address this concern, the Identity System can include generic templates for use when matching criteria is not satisfied.

The Identity System retrieves schema information for the object class identified in step 300 (step 304). In one embodiment, the schema is maintained in Directory 36. The schema identifies each attribute in the object class and information relating to the attributes. In some instances, a schema may not provide any information about the attributes, but merely list the attributes for reference. In one implementation, the schema for an object class identifies attributes that are required by the object class and attributes that are supported by the object class, but not required. In one embodiment, the Identity System retrieves the entire schema. In alternate embodiments, only portions of the schema are retrieved.

In one implementation, the schema identifies the following information for each attribute: 1) attribute name—identifying the name for the attribute; 2) attribute alias—identifying any aliases used to identify the attribute; 3) attribute identifier—providing a unique identifier for the attribute; and 4) syntax—identifying the attribute syntax, such as case insensitive string, integer, and binary. Those skilled in the art will recognize that this is only one example of a schema format. In different embodiments, many different schema formats can be employed. The Identity System uses the schema information to identify the attributes in the identified object class from step 300.

The Identity System employs the schema information and template to configure the object class (step 306). The schema identifies object class attributes, and the template provides configuration information for the attributes. In one implementation, the Identity System assigns a meta-attribute to each attribute. Alternatively, the Identity System performs additional or different operations, such as associating attributes in the object class with entries in the template—providing the Identity System with awareness of how Directory 36 identifies objects and attributes employed by the Identity System. The configuration allows the Identity System and Directory 36 to communicate using a common language that recognizes a common set of objects and treats attributes in those objects in the same manner.

After configuring the object class, the Identity System presents the object class configuration to the system administrator (step 308). The system administrator reviews the configuration and determines whether any changes are necessary. The system administrator may recognize that some automatic configuration results fail to comply with the system administrator's implementation of the Identity System. If no changes are required (step 310), the configuration process is complete. Otherwise, the Identity System allows the administrator to manually modify the object class configuration (step 312). In one implementation, the Identity System provides a graphical user interface that allows the system administrator to review object class configuration (step 308) and implement modifications (step 312).

Figure 8:
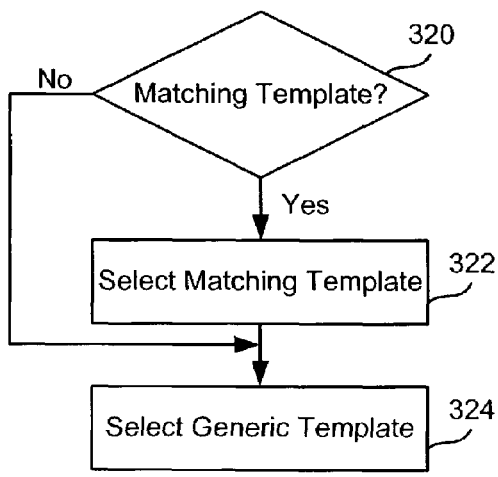
FIG. 8 is a flowchart depicting one embodiment of a process for identifying a template.

FIG. 8 is a flowchart depicting one embodiment of a process for identifying a template (step 302, FIG. 7). The Identity System determines whether a matching template exists for the object class identified in step 300 (step 320). In one implementation, a match is found when the Identity System recognizes a template having the same name as the identified object class. In alternate embodiments, various techniques can be employed for determining whether a matching template exists. In one example, the Identity System identifies a template as matching if the template's name has a predetermined level of similarity to the name of the identified object class. In another embodiment, the Identity System identifies a template as matching when entries in the template correspond to attributes in the identified object class. In some instances, a template may match more than one object class.

If a matching template is identified, the Identity System selects the matching template (step 322). Otherwise, the Identity System selects a generic template (step 324). The generic template can have many different forms in different embodiments of the present invention. In one embodiment, the generic template includes a list of many attributes that may be used across multiple object classes. In another embodiment, the generic template includes several generic entries that correspond to generalized attribute formats. In a further embodiment, the generic template only includes one generic entry.

FIG. 9 is a flowchart depicting one embodiment of a process for configuring an object class (step 306, FIG. 7). The Identity System selects an attribute in the object class (step 340). In different embodiments of the present invention, the process for selecting an attribute can vary. In one implementation, the Identity System selects attributes from an ordered list. In alternate embodiments, the Identity System randomly selects attributes from a list. In one implementation, only a mandatory set of attributes within the object class are eligible for selection, while in other embodiments, all attributes in the object class are eligible for selection.

The Identity System configures the selected attribute (step 342). The attribute configuration allows the Identity System to recognize and utilize the attribute. One implementation of attribute configuration includes the Identity System assigning a meta-attribute to the selected attribute. In alternate embodiments, the Identity System performs additional or different configuration operations, such as making an association between the selected attribute and a template entry.

The Identity System determines whether any of the object class attributes that are eligible for selection remain unselected (step 344). If any of the attributes have not yet been selected, the Identity System selects an object class attribute (step 340) and repeats the above-described process. Otherwise, the object class configuration is complete.

FIG. 10 is a flowchart depicting one embodiment of a process for configuring a selected attribute in an object class (step 342, FIG. 9). The Identity System attempts to determine whether any of the entries in the template correspond to the selected attribute from the object class. The Identity System can then configure the selected attribute based on the corresponding template entry. In the implementation shown in FIG. 10, the Identity System identifies a template entry that corresponds to the selected attribute by selecting a matching template entry or default template entry.

The Identity System determines whether any of the entries in the identified template match the selected attribute (step 360). In different embodiments, various forms of criteria are applied to determine whether a template entry matches a selected attribute. In one implementation, a match is found if the template entry has a name or field corresponding to the name of the selected attribute. Alternatively, the Identity System can employ different filtering techniques to determine whether a match occurs. In one implementation, the Identity System finds a match when a template entry includes a character pattern with a predetermined level of similarity to the name of the selected attribute. The Identity System can also employ values other than the attribute name for matching, such as the attribute's unique identifier. Alternatively, a match can be found when a selected attribute has a set of characteristics that correspond to an entry in the template.

If a matching entry is found (step 360), the Identity System assigns a meta-attribute from the matching template entry to the selected attribute (step 362). In one embodiment, the assigned meta-attribute includes a number of components, as described above. The Identity System stores the meta-attribute for the attribute in a corresponding object in Directory 36 in one implementation. In this implementation, an object class exists for meta-attributes. The Identity System creates an object for each meta-attribute and stores the meta-attribute's components and their values in the object.

In an alternate embodiment, the Identity System stores a meta-attribute for the selected attribute in an object in Directory 36 for the selected attribute. In this embodiment, the Identity System supports an attribute object class—each attribute has an associated object that lists at least the attribute and its associated meta-attribute.

If a matching template entry is not found (step 360), the Identity System determines whether to employ a default template entry (step 364). In one implementation, a default template entry provides a generic set of meta-attribute components and values that can be assigned to the selected attribute. If it is not desirable to employ a default template entry, the Identity System leaves the attribute without any new information and is done with the configuration process. In an alternate embodiment, the decision not to use a default template entry halts the entire object class configuration. This can be the case when the selected attribute needs to be configured by a matching template entry in order for the Identity System to recognize the attribute. In one example, matching template entries are required for user name and login identification attributes in the user object class. Many different attributes can be mandatory in alternate embodiments.

If it is desirable to use a default template entry, the Identity System assigns the meta-attribute from the default entry to the selected attribute. In one implementation, the default entry includes the meta-attribute components listed above and provides the following default values: 1) cardinality—single value; 2) display type—text; and 3) version—the current version of the Identity System software. In alternate embodiments, different default values and meta-attribute components can be provided.

Although the configuration process described in FIG. 10 deals with the assignment of meta-attributes, those skilled in the art will recognize that many different configuration operations can be performed. Another configuration operation is to create a mapping or association between the selected attribute and the template entry.

FIG. 11 is a flowchart depicting one embodiment of a process for determining whether a template includes an entry match for a selected attribute in an object class (step 360, FIG. 10). The Identity System determines whether a template entry lists the selected attribute (step 380). In one implementation, this step includes determining whether a template entry has an associated name or field that exactly matches the name for the selected attribute. In an alternate embodiment, the listing of the template entry may not have to be an exact match of the selected attribute name. In further embodiments, the Identity System uses an attribute's unique identification, or other distinguishing criteria, to perform step 380.

If the selected attribute is listed in the template entry (step 380), a match is found and the process in FIG. 11 is complete. Otherwise, the Identity System determines whether any entry in the template satisfies a set of filter criteria related to the selected attribute (step 382). In one example, the filter criteria requires the entry to have a name or character field with a predetermined level of similarity to the name or other distinguishing characteristic of the selected attribute. In a further embodiment, the filter calls for the template entry to have a meta-attribute with components that are relevant to the selected attribute. In various embodiments of the present invention, different criteria can be employed for making a determination in step 382. In one embodiment, the Identity System only performs a filter test—eliminating the need for step 380. Such a filter can include the matching performed in step 380. If the filter is satisfied, a matching template entry is found. Otherwise, no matching template entry is identified.

In further embodiments, the processes described above with reference to FIGS. 7-11 are applied to attribute sets other than object classes. In one embodiment, attributes in a class of database table are configured in the manner described above for attributes in an object class. Attribute sets other than object classes and database table classes can be employed in additional embodiments.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A computer implemented method for attribute set configuration, the method comprising:

identifying a class to be configured, wherein the class describes a type of object used to identify an entity in a directory and identifies a format for each object described by the class, and wherein the class comprises an attribute set comprising a plurality of attributes, each of the plurality of attributes describing a trait of the entity identified by the object that is described by the class, and specifies that the set of attributes is to be included in each object described by the class;

identifying a template for said attribute set, said template includes configuration information other than schema information for at least one attribute in said attribute set; and configuring said class by configuring said attribute set in said class, based at least in part on said configuration information;

wherein the class describes a plurality of objects, each comprising the set of attributes specified by the class, the set of attributes comprising a first attribute of a first type, the plurality of objects comprising a first object in which an attribute of the first type has a first value, and a second object in which an attribute of the first type has a second value.

2. The computer implemented method according to claim 1, wherein said method further comprises:

retrieving schema information for said attribute set.

3. The computer implemented method according to claim 2, wherein said schema information identifies at least one attribute in said attribute set.

4. The computer implemented method according to claim 1, wherein identifying a template for said attribute set comprises:

determining whether a template matches said attribute set.

5. The computer implemented method according to claim 4, wherein identifying a template for said attribute set comprises:

selecting a template determined to match said attribute set.

6. The computer implemented method according to claim 4, wherein identifying a template for said attribute set comprises:
    selecting a generic template, if it is determined that no template matches said attribute set.

7. The computer implemented method according to claim 1, wherein configuring said class by configuring said attribute set in said class comprises:
    configuring said at least one attribute in said attribute set.

8. The computer implemented method according to claim 7, wherein configuring said at least one attribute in said attribute set comprises:
    identifying an entry in said template; and
    configuring said at least one attribute in said attribute set, based at least in part on said entry.

9. The computer implemented method according to claim 8, wherein configuring said at least one attribute in said attribute set, based at least in part on said entry comprises:
    assigning a meta-attribute to said at least one attribute.

10. The computer implemented method according to claim 9, wherein said meta-attribute includes at least one component from a set of components consisting of cardinality, display name, display type, searchable, version, visible, and semantic type.

11. The computer implemented method according to claim 9, wherein said entry matches said at least one attribute.

12. The computer implemented method according to claim 9, wherein said entry is a default entry in said template.

13. The computer implemented method according to claim 9, wherein said entry identifies said meta-attribute.

14. The computer implemented method according to claim 13, wherein said entry contains said meta-attribute.

15. The computer implemented method according to claim 9, wherein assigning a meta-attribute to said at least one attribute comprises:
    creating an object that specifies said meta-attribute for said at least one attribute.

16. The computer implemented method according to claim 8, wherein identifying an entry in said template comprises:
    determining whether said at least one attribute is listed in said entry in said template.

17. The computer implemented method according to claim 8, wherein identifying an entry in said template comprises:
    determining whether said entry in said template satisfies a filter.

18. The computer implemented method according to claim 17, wherein said filter requires said entry in said template to include a character string having a predetermined level of similarity with said at least one attribute.

19. The computer implemented method according to claim 17, wherein said filter requires said entry in said template to specify a meta-attribute including at least one predetermined component.

20. The computer implemented method according to claim 1, wherein said attribute set is a class of database table.

21. The computer implemented method according to claim 1, wherein said method is performed by an Identity System.

22. The computer implemented method according to claim 1, wherein said method is performed by an Access System.

23. The computer implemented method according to claim 1, wherein said method is performed by an integrated Identity/Access System.

24. One or more processor readable storage devices having processor readable code embodied on said one or more processor readable storage devices, said processor readable code for programming one or more processors and comprising:
    code for identifying a class to be configured, wherein the class describes a type of object used to identify an entity in a directory and identifies a format for each object described by the class, and wherein the class comprises an attribute set comprising a plurality of attributes, each of the plurality of attributes describing a trait of the entity identified by the object that is described by the class, and specifies that the set of attributes is to be included in each object described by the class;
    code for identifying a template for said attribute set, said template includes configuration information for at least one attribute in said attribute set said configuration information includes information on how to display said at least one attribute; and
    code for configuring said class by configuring said attribute set in said class, based at least in part on said configuration information;
    wherein the class describes a plurality of objects, each comprising the set of attributes specified by the class, the set of attributes comprising a first attribute of a first type, the plurality of objects comprising a first object in which an attribute of the first type has a first value, and a second object in which an attribute of the first type has a second value.

25. One or more processor readable storage devices according to claim 24, wherein said code for identifying a template for said attribute set comprises:
    code for determining whether a template matches said attribute set.

26. One or more processor readable storage devices according to claim 24, wherein said code for configuring said class by configuring said attribute set in said class comprises:
    code for identifying an entry in said template; and
    code for configuring said at least one attribute in said attribute set, based at least in part on said entry.

27. One or more processor readable storage devices according to claim 26, wherein said code for configuring said at least one attribute in said attribute set comprises:
    code for assigning a meta-attribute to said at least one attribute.

28. One or more processor readable storage devices according to claim 27, wherein said entry matches said at least one attribute.

29. One or more processor readable storage devices according to claim 27, wherein:
    said entry is a default entry in said template;
    said configuration information is generic configuration information; and
    said default entry includes said generic configuration information.

30. One or more processor readable storage devices according to claim 27, wherein said entry identifies said meta-attribute.

31. One or more processor readable storage devices according to claim 27, wherein said code for assigning said meta-attribute to said at least one attribute comprises:
    code for creating an object that specifies said meta-attribute for said at least one attribute.

32. One or more processor readable storage devices according to claim 26, wherein code for identifying an entry in said template comprises:
    code for determining whether said at least one attribute is listed in said entry in said template.

33. One or more processor readable storage devices according to claim 26, wherein code for identifying an entry in said template comprises:

code for determining whether said entry in said template satisfies a filter.

34. One or more processor readable storage devices according to claim 24, wherein said attribute set is a class of database table.

35. One or more processor readable storage devices according to claim 24, wherein said code is executable by an Identity System.

36. An apparatus, comprising:
one or more storage devices; and
one or more processors in communication with said one or more storage devices, wherein said one or more storage devices have embodied thereon processor readable code for programming said one or more processors, said processor readable code comprising:
code for identifying a class to be configured, wherein the class describes a type of object used to identify an entity in a directory and identifies a format for each object described by the class, and wherein the class comprises an attribute set comprising a plurality of attributes, each of the plurality of attributes describing a trait of the entity identified by the object that is described by the class, and specifies that the set of attributes is to be included in each object described by the class;
code for identifying a template for said attribute set, said template includes configuration information other than schema information for at least one attribute in said attribute set; and
code for configuring said class by configuring said attribute set in said class, based at least in part on said configuration information;
wherein the class describes a plurality of objects, each comprising the set of attributes specified by the class, the set of attributes comprising a first attribute of a first type, the plurality of objects comprising a first object in which an attribute of the first type has a first value, and a second object in which an attribute of the first type has a second value.

37. The apparatus according to claim 36, wherein said code for identifying a template for said attribute set comprises:
code for identifying an entry in said template; and
code for configuring said at least one attribute in said attribute set, based at least in part on said entry.

38. The apparatus according to claim 37, wherein said code for configuring said at least one attribute in said attribute set comprises:
code for assigning a meta-attribute to said at least one attribute.

39. The apparatus according to claim 38, wherein said code for assigning said meta-attribute to said at least one attribute comprises:
code for creating an object that specifies said meta-attribute for said at least one attribute.

40. The apparatus according to claim 36, wherein said attribute set is a class of database table.

41. The apparatus according to claim 36, wherein said apparatus comprises an Access System.

42. A computer implemented method for attribute set configuration, said method comprising:
identifying a class to be configured, wherein the class describes a type of object used to identify an entity in a directory and identifies a format for each object described by the class, and wherein the class comprises an attribute set comprising a plurality of attributes, each of the plurality of attributes describing a trait of the entity identified by the object that is described by the class, and specifies that the set of attributes is to be included in each object described by the class;
identifying a first entry in a template, said template includes configuration information for at least one attribute in said attribute set, said configuration information includes information on how to display said at least one attribute; and
configuring said class by configuring an attribute in said attribute set in said class, based at least in part on said configuration information;
wherein the class describes a plurality of objects, each comprising the set of attributes specified by the class, the set of attributes comprising a first attribute of a first type, the plurality of objects comprising a first object in which an attribute of the first type has a first value, and a second object in which an attribute of the first type has a second value.

43. The computer implemented method according to claim 42, wherein said method further comprises:
identifying said template for said attribute set.

44. The computer implemented method according to claim 42, wherein said first entry matches said attribute and includes said configuration information.

45. The computer implemented method according to claim 42, wherein said first entry is a default entry in said template.

46. The computer implemented method according to claim 42, wherein identifying a first entry in a template comprises:
determining whether said template contains an entry matching said attribute.

47. The computer implemented method according to claim 46, wherein determining whether said template contains an entry matching said attribute comprises:
determining whether said attribute is listed in an entry in said template.

48. The computer implemented method according to claim 46, wherein determining whether said template contains an entry matching said attribute comprises:
determining whether an entry in said template satisfies a filter.

49. The computer implemented method according to claim 48, wherein said filter requires an entry in said template to include a character string having a predetermined level of similarity with said attribute.

50. The computer implemented method according to claim 48, wherein said filter requires an entry in said template to specify a meta-attribute including at least one predetermined component.

51. The computer implemented method according to claim 46, wherein configuring said class by configuring an attribute in said attribute set in said class comprises:
automatically assigning a meta-attribute specified in said first entry to said attribute, if it is determined that said first entry matches said attribute.

52. The computer implemented method according to claim 51, wherein said meta-attribute includes at least one component from a set of components consisting of cardinality, display name, display type, searchable, version, visible, and semantic type.

53. The computer implemented method according to claim 46, wherein identifying a first entry in a template comprises:
determining whether to use a default entry in said template as said first entry, if it is determined that no entry in said template matches said attribute.

54. The computer implemented method according to claim 53, wherein it is determined to use said default entry in said template as said first entry and configuring said class by configuring an attribute in said attribute set in said class comprises:

assigning a meta-attribute specified in said first entry to said attribute.

55. The computer implemented method according to claim 42, wherein configuring said class by configuring an attribute in said attribute set in said class comprises:

assigning a meta-attribute specified in said first entry to said attribute.

56. The computer implemented method according to claim 55, wherein said first entry contains said meta-attribute.

57. The computer implemented method according to claim 55, wherein assigning a meta-attribute specified in said first entry to said attribute comprises:

storing said meta-attribute in an object corresponding to said attribute.

58. The computer implemented method according to claim 42, wherein said attribute set is a class of database table.

59. The computer implemented method according to claim 42, wherein said method is performed by an Identity System.

60. The computer implemented method according to claim 42, wherein said method is performed by an Access System.

61. The computer implemented method according to claim 42, wherein said method is performed by an integrated Identity/Access System.

62. One or more processor readable storage devices having processor readable code embodied on said one or more processor readable storage devices, said processor readable code for programming one or more processors and comprising:

code for identifying a class to be configured, wherein the class describes a type of object used to identify an entity in a directory and identifies a format for each object described by the class, and wherein the class comprises an attribute set comprising a plurality of attributes, each of the plurality of attributes describing a trait of the entity identified by the object that is described by the class, and specifies that the set of attributes is to be included in each object described by the class;

code for identifying a first entry in a template, said template includes configuration information other than schema information for at least one attribute in said attribute set; and code for configuring said class by configuring an attribute in said attribute set in said class, based at least in part on said configuration information;

wherein the class describes a plurality of objects, each comprising the set of attributes specified by the class, the set of attributes comprising a first attribute of a first type, the plurality of objects comprising a first object in which an attribute of the first type has a first value, and a second object in which an attribute of the first type has a second value.

63. One or more processor readable storage devices according to claim 62, wherein said first entry matches said attribute.

64. One or more processor readable storage devices according to claim 62, wherein said first entry is a default entry in said template.

65. One or more processor readable storage devices according to claim 62, wherein said code for identifying a first entry in a template comprises:

code for determining whether said template contains an entry matching said attribute.

66. One or more processor readable storage devices according to claim 65, wherein said code for determining whether said template contains an entry matching said attribute comprises:

code for determining whether said attribute is listed in an entry in said template.

67. One or more processor readable storage devices according to claim 65, wherein said code for determining whether said template contains an entry matching said attribute comprises:

code for determining whether an entry in said template satisfies a filter.

68. One or more processor readable storage devices according to claim 65, wherein it is determined that said first entry matches said attribute, and said code for configuring said class by configuring an attribute in said attribute set in said class comprises:

code for assigning a meta-attribute specified in said first entry to said attribute.

69. One or more processor readable storage devices according to claim 65, wherein said code for identifying a first entry in a template comprises:

code for determining whether to use a default entry in said template as said first entry, if it is determined that no entry in said template matches said attribute.

70. One or more processor readable storage devices according to claim 69, wherein it is determined to use said default entry in said template as said first entry and said code for configuring said class by configuring an attribute in said attribute set in said class comprises:

code for assigning a meta-attribute specified in said first entry to said attribute.

71. One or more processor readable storage devices according to claim 62, wherein said code for configuring said class by configuring an attribute in said attribute set in said class comprises:

code for assigning a meta-attribute specified in said first entry to said attribute.

72. One or more processor readable storage devices according to claim 62, wherein said attribute set is a class of database table.

73. One or more processor readable storage devices according to claim 62, wherein said code is executable by an Identity System.

74. An apparatus, comprising:

one or more storage devices; and one or more processors in communication with said one or more storage devices, wherein said one or more storage devices have embodied thereon processor readable code for programming said one or more processors, said processor readable code comprising:

code for identifying a class to be configured, wherein the class describes a type of object used to identify an entity in a directory and identifies a format for each object described by the class, and wherein the class comprises an attribute set comprising a plurality of attributes, each of the plurality of attributes describing a trait of the entity identified by the object that is described by the class, and specifies that the set of attributes is to be included in each object described by the class;

code for identifying a first entry in a template, said template includes configuration information for at least one attribute in said attribute set, said configuration information includes information on how to display said at least one attribute; and code for configuring said class by configuring an attribute in said attribute set in said class, based at least in part on said configuration information;
wherein the class describes a plurality of objects, each comprising the set of attributes specified by the class, the set of attributes comprising a first attribute of a first type, the plurality of objects comprising a first object in which an attribute of the first type has a first value, and a second object in which an attribute of the first type has a second value.

75. The apparatus according to claim 74, wherein said code for identifying a first entry in a template comprises:
code for determining whether said template contains an entry matching said attribute.

76. The apparatus according to claim 75, wherein said code for determining whether said template contains an entry matching an attribute comprises:
code for determining whether said attribute is listed in an entry in said template.

77. The apparatus according to claim 75, wherein said code for determining whether said template contains an entry matching an attribute comprises:
code for determining whether an entry in said template satisfies a filter.

78. The apparatus according to claim 75, wherein it is determined in that said first entry matches said attribute and said code for configuring said class by configuring an attribute in said attribute set in said class comprises:
code for assigning a meta-attribute specified in said first entry to said attribute.

79. The apparatus according to claim 75, wherein said code for identifying a first entry in a template comprises:
code for determining whether to use a default entry in said template as said first entry, if it is determined that no entry in said template matches said attribute.

80. The apparatus according to claim 74, wherein said code for configuring said class by configuring an attribute in said attribute set in said class comprises:
code for assigning a meta-attribute specified in said first entry to said attribute.

81. The apparatus according to claim 74, wherein said attribute set is a class of database table.

82. The apparatus according to claim 74, wherein said apparatus comprises an Access System.

83. The method according to claim 1, wherein:
said configuration information for at least one attribute includes a meta-attribute; and
configuring said class by configuring said attribute set in said class includes assigning said meta-attribute to said at least one attribute.

84. The method according to claim 83, wherein:
identifying a template for said attribute set comprises determining whether a template matches said attribute set; and
said meta-attribute is automatically assigned to said at least one attribute if said template matches said attribute set.

85. The method according to claim 83, wherein:
said method is performed by a software system; and
said assigned meta-attribute allows said software system to recognize and utilize said at least one attribute.

86. The method according to claim 2, further comprising:
identifying one or more attributes in said attribute set based on said schema information.

87. The method according to claim 86, further comprising, for each of said identified attributes:
determining whether said template includes an entry matching said identified attribute; and
assigning a meta-attribute to said identified attribute if said entry matches said identified attribute, said entry identifies said meta-attribute.

88. The method according to claim 87, further comprising, for each of said identified attributes:
assigning a generic meta-attribute to said identified attribute if said entry does not match said identified attribute.

89. One or more processor readable storage devices according to claim 24, wherein:
said configuration information for at least one attribute includes a meta-attribute; and
said code for configuring said class by configuring said attribute set in said class comprises code for assigning said meta-attribute to said at least one attribute.

90. One or more processor readable storage devices according to claim 89, wherein:
said code for identifying a template for said attribute set comprises code for determining whether a template matches said attribute set; and
said meta-attribute is automatically assigned to said at least one attribute if said template matches said attribute set.

91. One or more processor readable storage devices according to claim 24, wherein said processor readable code further comprises:
code for retrieving schema information for said attribute set; and
code for identifying one or more attributes in said attribute set based on said schema information.

92. One or more processor readable storage devices according to claim 91, wherein said processor readable code further comprises, for each of said identified attributes:
code for determining whether said template includes an entry matching said identified attribute; and
code for assigning a meta-attribute to said identified attribute if said entry matches said identified attribute, said entry identifies said meta-attribute.

93. The apparatus according to claim 36, wherein:
said configuration information for at least one attribute includes a meta-attribute; and
said code for configuring said class by configuring said attribute set in said class comprises code for assigning said meta-attribute to said at least one attribute.

94. The apparatus according to claim 93, wherein:
said code for identifying a template for said attribute set comprises code for determining whether a template matches said attribute set; and
said meta-attribute is automatically assigned to said at least one attribute if said template matches said attribute set.

95. The apparatus according to claim 36, wherein said processor readable code further comprises:
code for retrieving schema information for said attribute set;
code for identifying one or more attributes in said attribute set based on said schema information.

96. The apparatus according to claim 95, wherein said processor readable code further comprises, for each of said identified attributes:
code for determining whether said template includes an entry matching said identified attribute; and
code for assigning a meta-attribute to said identified attribute if said entry matches said identified attribute, said entry identifies said meta-attribute.

97. The method according to claim 42, wherein identifying a first entry in a template comprises:
retrieving schema information for said attribute set;

identifying one or more attributes in said attribute set based on said schema information;

determining whether said first entry matches one of said one or more attributes.

98. A computer implemented method for attribute set configuration, the method comprising:

identifying a class to be configured, wherein the class describes a type of object used to identify an entity in a directory and identifies a format for each object described by the class, and wherein the class comprises an attribute set comprising a plurality of attributes, each of the plurality of attributes describing a trait of the entity identified by the object that is described by the class, and specifies that the set of attributes is to be included in each object described by the class;

identifying a template for an attribute set, said template includes configuration information for at least one attribute in said attribute set, said configuration information including at least one of a cardinality component, display name component, display type component, searchable component, version component, visible component, and semantic type component identifying a special action associated with the attribute; and configuring said class by configuring said attribute set in said class, based at least in part on said configuration information;

wherein the class describes a plurality of objects, each comprising the set of attributes specified by the class, the set of attributes comprising a first attribute of a first type, the plurality of objects comprising a first object in which an attribute of the first type has a first value, and a second object in which an attribute of the first type has a second value.

99. The computer implemented method according to claim 1, wherein a plurality of classes describe a type of object used to identify an entity in a directory, and wherein identifying a class to be configured comprises:

selecting a class from among the plurality of classes.

100. The computer implemented method according to claim 1, further comprising:

displaying, for a user, a configuration of the class.

* * * * *